A. KINYON.
REISSUED JUL 25 1871
*Impt. Corn Cultivator.*
4485
Fig. 1
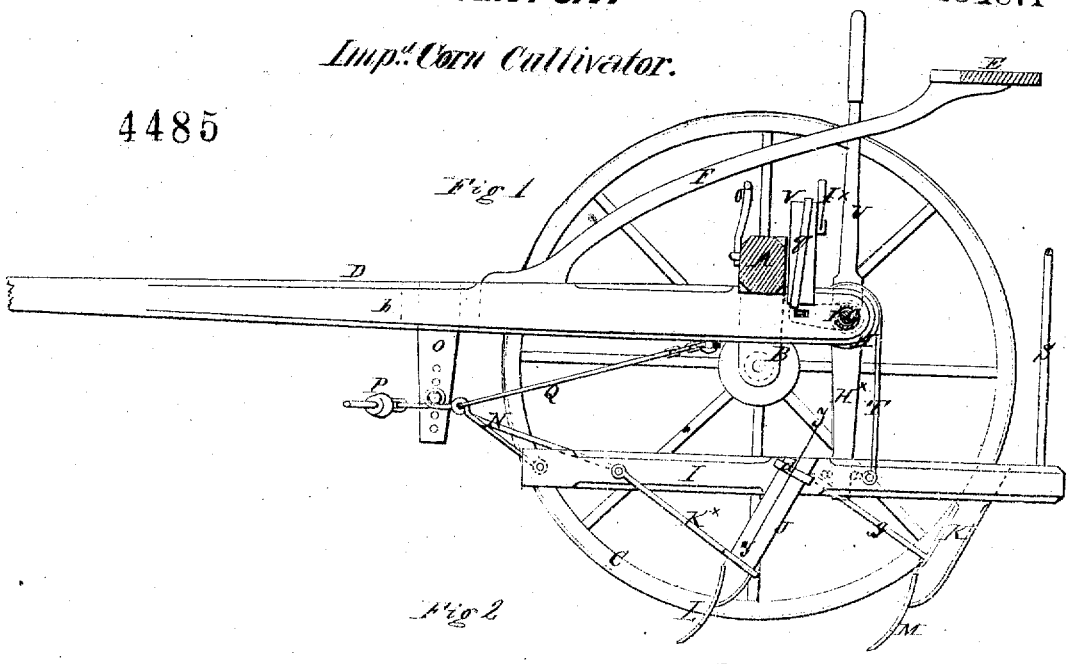
Fig. 2
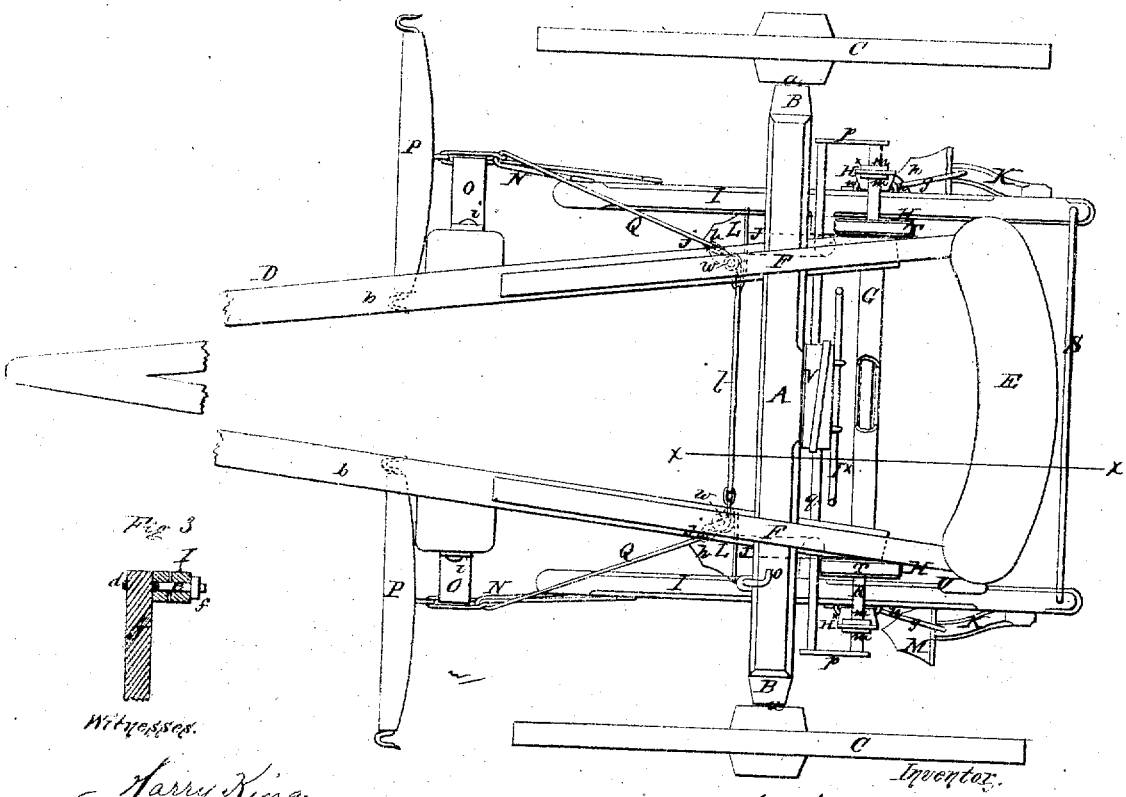
Fig. 3
Witnesses.
Harry King.
Phil T. Dodge
Inventor.
A. Kinyon
by Dodge & Munn
Attys.
AM. PHOTO-LITHOGRAPHIC CO. N.Y. (OSBORNE'S PROCESS.)

UNITED STATES PATENT OFFICE.

ALONZO KINYON, OF AMBOY, ILLINOIS.

IMPROVEMENT IN CORN-CULTIVATORS.

Specification forming part of Letters Patent No. 45,503, dated December 20, 1864; reissue No. 4,485, dated July 25, 1871.

*To all whom it may concern:*

Be it known that I, ALONZO KINYON, of Amboy, in the county of Lee and State of Illinois, have invented certain Improvements in Corn-Cultivators, of which the following is a specification, reference being had to the accompanying drawing, in which like letters indicate like parts wherever they occur.

A represents the axle of the machine, and has brackets B secured to each end of it upon its under side, provided with an arm on each, on which the wheels C are placed. D represents the draft-pole, which is composed of two parts, *b b*, arranged in V-form, meeting at the front ends and gradually widening toward the rear ends, the parts being firmly secured to the axle at or near their rear ends, thus constituting a draft-pole and frame structure of light and simple character to which to attach the plow-beams and draft apparatus in front at O, and at the rear ends to suspend and support the rear ends of the beams when the plows require to be elevated above the ground. G is a tubular shaft, which has its bearings in the back parts of the draft-pole, and is provided with a pulley, H, at each end. E is the driver's seat, which is attached to two inclined elastic supports, F F, the latter being secured to the parts of the draft-pole. I I are two plow-beams, each of which has two standards, J K, secured to it. The front standards are of round or cylindrical form at their upper ends, and are connected to the beams I I by eye or socket-bolts *d e*, which pass through saddles or half-cylindrical bosses upon the beams in which the round standards rest, and also through the beams I I to receive the screw-nuts *f* upon their outer ends, which, on being turned up tight, firmly attach the standards J to the beams I I; said standards being also supported from the beams I I by rods, which are fitted with a loop or eye upon the round part of the standard J at the lower end, and attached to beam I at the other end of the standard so as to tie or brace and properly support the same. The standards J J, being thus only held in loops, can readily be adjusted up or down upon the beams, or turned to the right or left to cause the plow to cast the earth in any desired direction. The back standards K are permanently secured to the beams I I, and fitted with plows not unlike those upon the front standards. The front ends of the beams I I are connected by links N to bent bars O, which are attached at their upper ends to parts *b b* of the draft-pole by means of bolts *i*, the bars O being allowed to swing or turn radially upon the bolts, and having a series of holes in each to admit of the adjustment of the links N higher or lower, as may be desired. To the bars O the whiffletrees are attached. Within the tubular shaft G is loosely fitted a rod, R, which extends some distance beyond the ends of G, and has a screw-cup upon each end. On the ends R are two pendants, $H^{\times}$ $H^{\times}$, which may be adjusted nearer to or further from the ends of rod R by means of the screw-nuts *m m*. The lower ends of these pendants are fitted with loops *n* at the sides of the plow-beams, and, by adjusting pendants $H^{\times}$ $H^{\times}$ on the rods R, the beams and plows I I may be adjusted nearer together or further apart, as may be desired. Q Q are rods, attached onto the back of bar O, said rods having chains *j* connected to their back ends, thence around pulley W or pins at the under sides of parts *b b* of the draft-pole, and attached at their ends to a rod, *l*, and, thus arranged, forming a draft-equalizer for the team. The rear ends of the plow-beams are connected by an elastic semicircular rod, S, and each beam is connected, by a strap, I, with a pulley, H. On shaft G is a lever, U, which is attached to shaft G, and, by actuating the former, the latter may be turned so as to raise and lower the plows, as may be desired, and the plows may be held up out of the ground by throwing the lever forward under a hook attached to the axle A. To each end of rod R is attached an arm, *p*. These arms extend forward toward the front end of the machine, and have a strap or cord, *q*, connected to them which passes around a pulley, V, at the rear side of the axle A, said pulley having a bar for the foot of the driver to rest upon. By actuating the pulley V the rod R will be moved in a lateral direction relatively with the machine, and the plows J K will be moved in a corresponding direction so as to conform to the sinuosities of the rows of plants. The plows, it will be noticed, are actuated by the driver from his seat E.

What I claim as new, and desire to secure by Letters Patent, is—

1. The rounded standard J, having a shovel, L, attached thereto, and secured to the frame or beam of a cultivator by means of an eyebolt, substantially as described, whereby the shovel may be adjusted, as set forth.

2. In combination with the foregoing, the brace-rod K, arranged to operate as set forth.

3. The tubular shaft G, provided with the lever U, and connected, by the straps T, to the beams I, whereby the shovels may be elevated at will, as set forth.

4. The sliding rod R, provided with the rigid arms *p* and H, the latter being connected loosely to the beams I, and the former, by straps *q*, to a pulley, V, having a foot-lever, I*, attached, all arranged to operate as set forth, whereby the beams, with their standards and shovels, may be moved laterally at will, as set forth.

ALONZO KINYON.

Witnesses:
N. C. GRIDLEY,
N. H. SHERBURNE.